(12) United States Patent
Heo et al.

(10) Patent No.: US 9,992,007 B2
(45) Date of Patent: *Jun. 5, 2018

(54) METHOD AND APPARATUS FOR TRANSMITTING UPLINK CONTROL INFORMATION IN MULTI-CARRIER WIRELESS COMMUNICATION SYSTEM

(71) Applicant: Samsung Electronics Co., Ltd., Gyeonggi-do (KR)

(72) Inventors: Youn Hyoung Heo, Gyeonggi-do (KR); Joon Young Cho, Gyeonggi-do (KR); Ju Ho Lee, Gyeonggi-do (KR); Jin Kyu Han, Seoul (KR); Farooq Khan, Richardson, TX (US); Jianzhong Zhang, Richardson, TX (US)

(73) Assignee: Samsung Electronics Co., Ltd (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/589,556

(22) Filed: May 8, 2017

(65) Prior Publication Data

US 2017/0244534 A1 Aug. 24, 2017

Related U.S. Application Data

(63) Continuation of application No. 14/456,655, filed on Aug. 11, 2014, now Pat. No. 9,647,815, which is a
(Continued)

(30) Foreign Application Priority Data

Jan. 13, 2009 (KR) .................. 10-2009-0002808

(51) Int. Cl.
*H04L 5/00* (2006.01)
*H04W 72/04* (2009.01)
*H04L 1/18* (2006.01)

(52) U.S. Cl.
CPC .......... *H04L 5/0057* (2013.01); *H04L 1/1812* (2013.01); *H04L 1/1861* (2013.01);
(Continued)

(58) Field of Classification Search
CPC ... H04L 5/0057; H04L 1/1812; H04L 1/1861; H04L 1/1864; H04L 5/0037; H04W 72/0413

See application file for complete search history.

(56) References Cited

U.S. PATENT DOCUMENTS 8,908,679 B2  12/2014  Dinan
2005/0219999 A1  10/2005  Kim et al.
(Continued)

FOREIGN PATENT DOCUMENTS

CN  1973457  5/2007
EP  2 945 449  11/2015
(Continued)

OTHER PUBLICATIONS

LG, R1-091204, UL Control Channel Design to Support Carrier Agregation, 3GPP TSG RAN WG1 #56bis, Mar. 23-27, 2009, pp. 1-6.
(Continued)

*Primary Examiner* — Melvin Marcelo
(74) *Attorney, Agent, or Firm* — The Farrell Law Firm, P.C.

(57) ABSTRACT

A method and apparatus are provided for transmitting and receiving Uplink Control Information (UCI) in a wireless communication system. The method includes generating the UCI including at least one of channel quality indicator (CQI) information and hybrid automatic repeat request (HARQ) information; identifying, if the terminal is configured with a plurality of serving cells, a serving cell among the plurality of serving cells based on information on a cell index of the
(Continued)

serving cell; and transmitting the UCI on a physical uplink shared channel (PUSCH) of the identified serving cell.

24 Claims, 15 Drawing Sheets

Related U.S. Application Data continuation of application No. 13/144,403, filed as application No. PCT/KR2010/000206 on Jan. 13, 2010, now Pat. No. 8,804,636.

(52) U.S. Cl.
CPC .......... *H04L 1/1864* (2013.01); *H04L 5/0037* (2013.01); *H04W 72/0413* (2013.01)

(56) References Cited

U.S. PATENT DOCUMENTS

| | | |
|---|---|---|
| 2005/0232138 A1 | 10/2005 | Byun et al. |
| 2006/0013185 A1 | 1/2006 | Seo et al. |
| 2006/0013285 A1 | 1/2006 | Kobayashi et al. |
| 2008/0186916 A1 | 8/2008 | Oshiba et al. |
| 2009/0196366 A1 | 8/2009 | Shen |
| 2010/0098012 A1 | 4/2010 | Bala |
| 2010/0271970 A1 | 10/2010 | Pan et al. |
| 2011/0081904 A1 | 4/2011 | Kuo |
| 2011/0141928 A1 | 6/2011 | Shin et al. |
| 2011/0268045 A1 | 11/2011 | Heo et al. |
| 2011/0274043 A1 | 11/2011 | Nam et al. |

FOREIGN PATENT DOCUMENTS

| | | |
|---|---|---|
| JP | 2008-193414 | 8/2008 |
| KR | 1020090015813 | 2/2009 |
| KR | 1020100020753 | 2/2010 |
| KR | 1020110037920 | 4/2011 |

OTHER PUBLICATIONS

U.S. Appl. No. 61/171,609, filed Apr. 22, 2009.
PCT/ISA/237 Written Opinion issued on PCT/KR2010/000206 (4pp.) dated Aug. 9, 2010.
PCT/ISA/210 Search Report issued on PCT/KR2010/000206 (3pp.) dated Aug. 9, 2010.
Samsung, "Multiplexing ACK/NAK in the PUSCH", R1-080678, 3GPP TSG RAN WG1 #52, Feb. 11-15, 2008.
Samsung, "Multiplexing Control and Data in the PUSCH", R1-080679, 3GPP TSG RAN WG1 #52, Feb. 11-15, 2008.
Catt, "UCI on PUSCH for CA", R1-105160, 3GPP TSG RAN WG1 Meeting #62bis, Oct. 11-15, 2010, 2 pages.
Korean Office Action dated Jul. 24, 2015 issued in counterpart application No. 10-2014-0187913, 10 pages.
Texas Instruments, "Coding of Control Information on PUSCH", R1-081370, 3GPP TSG RAN WG1 52bis, Mar. 31-Apr. 4, 2008, 4 pages.
Nokia Siemens Networks, Nokia, "UL Control Signalling to Support Bandwidth Extension in LTE-Advanced", R1-090234, 3GPP TSG RAN WG1 Meeting #55bis, Jan. 12-16, 2009, 5 pages.
LG Electronics, "Considerations on DL/UL Transmission in Asymmetric Carrier Aggregation", R1-084197, 3GPP TSG RAN WG1 Meeting #55, Nov. 10-14, 2008, 6 pages.
Chinese Office Action dated Mar. 17, 2017 issued in counterpart application No. 201410663115.9, 13 pages.
European Search Report dated Jun. 8, 2016 issued in counterpart application No. 10731372.8-1874, 8 pages.
Korean Office Action dated Dec. 14, 2015 issued in counterpart application No. 10-2014-0187913, 4 pages.
U.S. Appl. No. 61/026,043, filed Feb. 4, 2008.
U.S. Appl. No. 61/039,230, filed Mar. 25, 2008.
U.S. Appl. No. 61/025,956, filed Feb. 4, 2008.
3GPP TSG RAN WG1 #52, Feb. 11-15, 2008.
R1-080679, 3GPP TSG RAN WG1 #52, Feb. 11-15, 2008.

UCI TRANSMISSION
104

DATA AND UCI TRANSMISSION
105

DATA AND UCI TRANSMISSION
802

METHOD AND APPARATUS FOR TRANSMITTING UPLINK CONTROL INFORMATION IN MULTI-CARRIER WIRELESS COMMUNICATION SYSTEM

PRIORITY

This application is a continuation application of U.S. patent application Ser. No. 14/456,655, which was filed in the U.S. Patent and Trademark Office (USPTO) on Aug. 11, 2014, which is a continuation application of U.S. patent application Ser. No. 13/144,403, which was filed in the USPTO on Jul. 13, 2011, as National Stage Entry of PCT/KR2010/000206, and issued as U.S. Pat. No. 8,804,636 on Aug. 12, 2014, and claims priority to Korean Application Serial No. 10-2009-0002808, which was filed in the Korean Intellectual Property Office on Jan. 13, 2009, the entire content of each of which is incorporated herein by reference.

BACKGROUND OF THE INVENTION

1. Field of the Invention The present invention relates to a multi-carrier wireless communication system and, in particular, to a method and apparatus for transmitting uplink control information on data channels in a wireless communication system supporting multicarrier transmission.

2. Description of the Related Art

Recently, Orthogonal Frequency Division Multiplexing (OFDM) is applied to most broadcast and wireless communication systems. OFDM is advantageous for wireless communication because of the robustness to the multipath fading channel, guaranteeing orthogonality between multiple access users, and spectrum efficiency. Due to these advantages, OFDM is considered as one of the most attractive transmission techniques for high speed and broadband communication system and even superior to the Direct Sequence-Code Divisional Multiple Access (DS-CDMA) technique. However, the high peak to average power ratio (PAPR) of the OFDM increases the power consumption, and this may decrease the coverage. For this reason, the 3GPP Long Term Evolution (LTE) uses the OFDM for the downlink and Single Carrier Frequency Division Multiple Access (SC-FDMA) for uplink to increase the coverage and reduce the power consumption of the mobile terminal. Since both the OFDM and SC-FDMA are multiplexing the users or channels in frequency domain, there is similarity in allocating frequency resources as the scheduling resources.

FIG. 1 is a diagram illustrating a structured of a subframe carrying Uplink Control Information (UCI) in the conventional LTE system, and FIG. 2 is a diagram illustrating a structure of a subframe carrying the UCI and data in the conventional LTE system.

The UCI includes the Acknowledgement/Negative-Acknowledgement (ACK/NACK) information related to data packet received in the downlink, Channel Quality Indicator (CQI) reports, and Rank Indicator (RI) information, and is transmitted on a Physical Uplink Control Channel (PUCCH). As shown in FIG. 1, the PUCCH 101 and 102 is transmitted on reserved frequency regions at the edges of the total available bandwidth in the uplink. In this case, when the mobile terminal transmits the packet data, the reserved frequency region cannot be used for PUCCH. This is because the simultaneous transmission of the PUCCH for the UCI and the Physical Uplink Shared Channel (PUSCH) for the data does not fulfill the single carrier characteristic and thus increases the PAPR.

In the current LTE system, the UCI is transmitted on the frequency resource allocated for the data, i.e. PUSCH, in the duration for transmitting the uplink data as shown in FIG. 2. In case of transmitting the UCI on the PUSCH resource, the multiplexing scheme is changed depending on the characteristic of the control information. That is, the CQI information is rate-matched, attached at the tail of data bits, and mapped to physical bits, thereby arranged at a rear position 107 of the subframe; and the ACK/NACK information is arranged at positions 106 where the data bits are punctured at both sides of the reference symbol. The RI information is arranged at both sides of the reference symbol as the ACK/NACK information between the data bits rather than puncturing the data bits. Since some parts of the resource allocated for the data transmission are used regardless of the transmission scheme, the data transmission amount is reduced as much as the resource used for transmitting the UCI.

How the resource amount for transmitting the UCI, when transmitting the UCI along with the data on the PUCCH resource, is described hereinafter.

Here, the resource means a number of symbols or a number of bits allocated for the PUSCH.

In case of transmitting the UCI on the PUCCH, the information bits are channel-coded such that the number of bits to be transmitted on the PUCCH is fixed per type of UCI. By increasing or decreasing the transmission power, the receipt quality can be maintained at a target level. In case of transmitting the UCI with the data on the PUSCH, the transmission power for the UCI should be equal to that for the data. If the data are transmitted in high spectral efficiency or high Modulation or at high Coding Scheme (MCS) level, the received Signal to Noise Ratio (SNR) per symbol increases; and otherwise, if the data are transmitted in low spectral efficiency or low MCS level, the received SNR per symbol decreases. In order to maintain the reception quality of the UCI, a number of transmission symbols for the UCI is needed to be adjusted in consideration of the data. In LTE, the number of transmission symbols required for the UCI is adjusted according to the spectral efficiency of the data transmitted on the PUSCH. This can be expressed by an equation. When the number of symbols available for transmitting the UCI is $Q'$, $Q'$ can be obtained using an equation. The number of symbols for transmitting the ACK/NACK or RI information is calculated as equation (1):

$$Q' = \min\left(\left\lceil \frac{O \cdot M_{sc}^{PUSCH} \cdot N_{symb}^{PUSCH} \cdot \beta_{offset}^{PUSCH}}{\sum_{r=0}^{C-1} K_r} \right\rceil, 4 \cdot M_{sc}^{PUSCH-current}\right) \quad (1)$$

where O denotes a number of bits of the ACK/NACK information or Rank Indicator (RI) information, $M_{SC}^{PUSCH}$ denotes a number of subcarriers allocated for the transmission of PUSCH, $N_{symb}^{PUSCH}$ denotes a number of SC-FDMA symbols for transmitting PUSCH, and $K_r$ is a number of data bits before channel coding. All these parameters are obtained from the PDCCH received at the initial transmission. $\beta_{offset}^{PUSCH}$ denotes an offset value for taking into consideration of the difference between target SNRs of the data and UCI.

Given a number of symbols, a number of bits to be channel-coded of each UCI can be obtained by equation (2) in consideration of the modulation scheme.

$$Q_{ACK} = Q_m \cdot Q' \quad (2)$$

where $Q_m$ is a value indicating the modulation scheme (set to '2' for QPSK and '4' for 16 QAM).

The equation for the CQI information is similar to that for the ACK/NACK information and RI basically. However, since a Cyclic Redundancy Check (CRC) can be added for the CQI large in size and the RI is always assigned the resource, the equation is modified for the remained resource to fulfill the minimum resource amount for the CQI information as equation (3):

$$Q' = \min\left(\left\lceil \frac{(O+L) \cdot M_{sc}^{PUSCH} \cdot N_{symb}^{PUSCH} \cdot \beta_{offset}^{PUSCH}}{\sum_{r=0}^{C-1} K_r} \right\rceil, \right. \quad (3)$$
$$\left. M_{sc}^{PUSCH-current} \cdot N_{symb}^{PUSCH-current} - \frac{Q_{RI}}{Q_m} \right)$$

where L denotes a number of CRC bits that are not inserted when O is equal to or less than 11 bits but inserted when O is greater than 11 bits, thereby being defined by $$L = \begin{cases} 0 & O \leq 11 \\ 8 & \text{otherwise} \end{cases}.$$

$M_{sc}^{PUSCH-current}$, $N_{symb}^{PUSCH-current}$ means numbers of subcarriers and SC-FDMA symbols constituting the subframe. $Q_{RI}$ denotes a number of bits for the RI information. Given the number of symbols, the number of CQI bits after channel coding according to the modulation scheme used for the CQI is calculated as equation (4):

$$Q_{CQI} = Q_m \cdot Q' \quad (4)$$

A multi-carrier transmission principle for the LTE-Advanced (LTE-A) is described hereinafter. In the current LTE system, a cell transmits multiple subcarriers on a single carrier, and the mobile terminal also transmits on a single carrier. In the LTE-A system, however, multiple carriers can be aggregated to increase the maximum transmission rate so as to provide spectral efficiency. Nevertheless, the respective carriers maintained in LTE structure to support legacy LTE terminals, and these carriers are called Component Carriers and aggregated to extend the entire bandwidth.

FIG. 3 is a diagram illustrating a principle of carrier aggregation in the LTE-A system. In FIG. 3, four Component Carriers are depicted exemplarily. Each of the four Component Carriers 201, 202, 203, and 204 has the reserved region at the edges for the PUCCH 205 and 206 and the data regions for the PDCCH region at the center.

Accordingly, there is a need for a method for a terminal to transmit the UCI and data simultaneously in the wireless communication system supporting the carrier aggregation. That is, although the LTE-A system uses the PUSCH resource for the transmission of the UCI and data as in the LTE system, there is a need to consider how to assign the resource for the UCI to support the carrier aggregation where the PUSCH is assigned multiple component carriers. There is therefor a need to define how to multiplex the UCI into multiple PUSCH resource, i.e. how many PUSCH symbols to be assigned for the UCI transmission.

SUMMARY OF THE INVENTION

In order to solve the above problems of prior arts, an aspect of the present invention is to provide a method for transmitting uplink control information along with data in a multicarrier communication system supporting carrier aggregation.

Since the LTE-A system supports allocation of PUSCH on multiple carriers, there is a need to define how to multiplex the UCI on the multiple carriers, i.e. how many number of PUSCH symbols to be assigned for the UCI transmission. Another aspect of the present invention, is to provide a method and apparatus for transmitting the UCI and data efficiently in an LTE-A system by introducing an algorithm that is capable of selecting the carrier to be used, calculating the PUSCH resource amount for transmitting the UCI on the PUSCH of the corresponding carrier, and multiplexing the UCI and data.

In accordance with an aspect of the present invention, a method is provided for a terminal in a wireless communication system. The method includes generating UCI including at least one of CQI information and HARQ information; identifying, if the terminal is configured with a plurality of serving cells, a serving cell among the plurality of serving cells based on information on a cell index of the serving cell; and transmitting the UCI on a PUSCH of the identified serving cell.

In accordance with another aspect of the present invention, a terminal is provided for a wireless communication system. The terminal includes a transceiver; and a controller configured to generate UCI including at least one of CQI information and HARQ information, identify, if the terminal is configured with a plurality of serving cells, a serving cell among the plurality of serving cells based on information on a cell index of the serving cell, and transmit, via the transceiver, the UCI on a PUSCH of the identified serving cell.

In accordance with another aspect of the present invention, a method is provided for a base station in a wireless communication system. The method includes receiving UCI including at least one of CQI information and HARQ information through a serving cell of a terminal configured with a plurality of serving cells; and decoding the UCI. The serving cell for receiving the UCI among the plurality of serving cells is determined based on information on a cell index of the serving cell.

In accordance with another aspect of the present invention, a base station is provided for a wireless communication system. The base station includes a transceiver; and a controller configured to receive UCI including at least one of CQI information and HARQ information through a serving cell of a terminal configured with a plurality of serving cells, and decode the UCI. The serving cell for receiving the UCI among the plurality of serving cells is determined based on information on a cell index of the serving cell.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The present invention provides a method for transmitting uplink data and control information simultaneously and efficiently in a wireless communication system supporting multicarrier transmission. That is, the present invention provides a method and apparatus for a mobile terminal to transmit the UCI along with the data in a LTE-A system supporting carrier aggregation. In case of simultaneous transmission of the data and UCI, the UCI is carried on the PUSCH resources of multiple component carriers. The present invention provides a method for assigning the resources for transmitting the UCI in carrier aggregation mode. The UCI transmission method of the present invention is capable of improving UCI reliability without compromising the data transmission performance. The exemplary embodiments of the UCI transmission method of the present invention are described hereinafter.

In the UCI transmission method for a wireless communication system supporting carrier aggregation according to a first exemplary embodiment of the present invention, the transmitter divides the UCI into segments and multiplexes the UCI segments into a number of PUSCHs such that the UCI segments are transmitted with the data simultaneously, and the receiver demultiplexes the UCI segments from the multiple PUSCHs into the original UCI.

In the UCI transmission method for a wireless communication system supporting carrier aggregation according to a second exemplary embodiment of the present invention, the transmitter transmits the UCI on the PUSCH resource of one of multiple aggregated carriers, and the receiver extracts the UCI from the PUSCH resource of the corresponding carrier.

First Embodiment

In the first embodiment of the present invention, when a subframe carries the UCI and data simultaneously, the UCI is segmented into multiple pieces and then transmitted on the multiple PUSCHs in a distributed manner.

Figure 1:
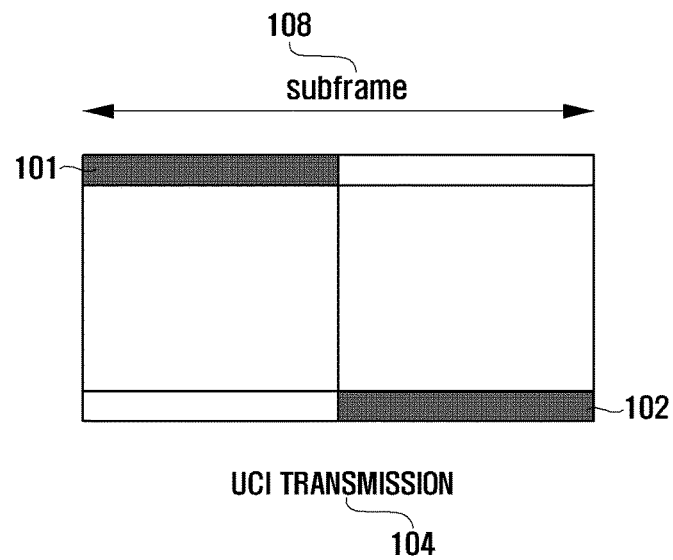
FIG. 1 is a diagram illustrating a structured of a subframe carrying Uplink Control Information (UCI) in the conventional LTE system.
Figure 2:
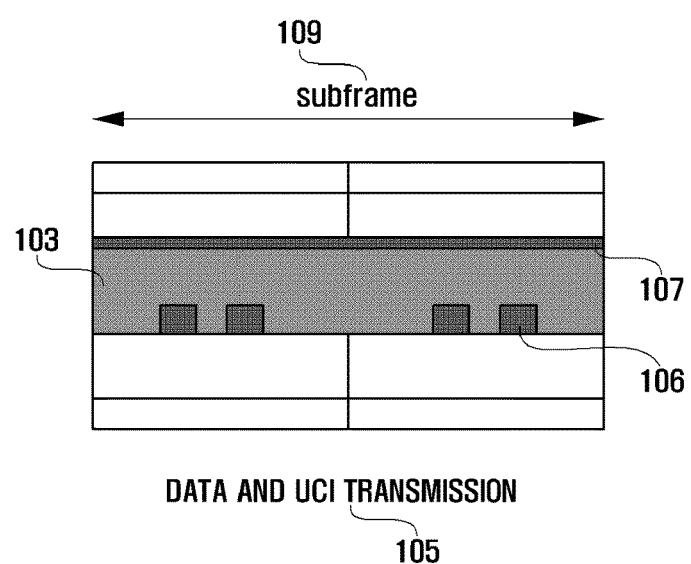
FIG. 2 is a diagram illustrating a structure of a subframe carrying the UCI and data in the conventional LTE system.
Figure 3:
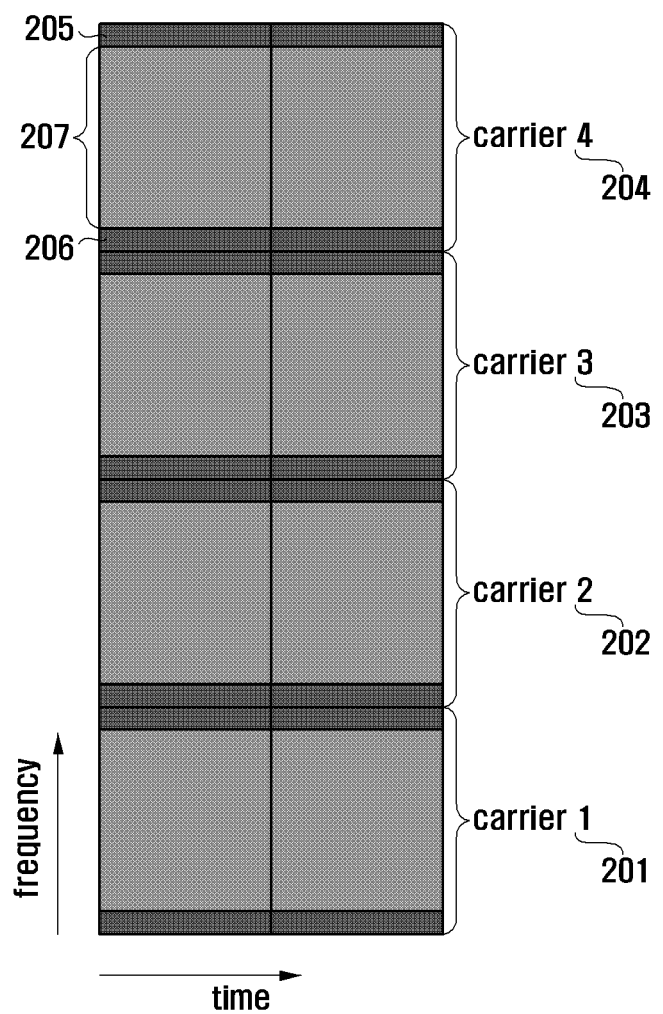
FIG. 3 is a diagram illustrating a principle of carrier aggregation in the LTE-A system.
Figure 4:
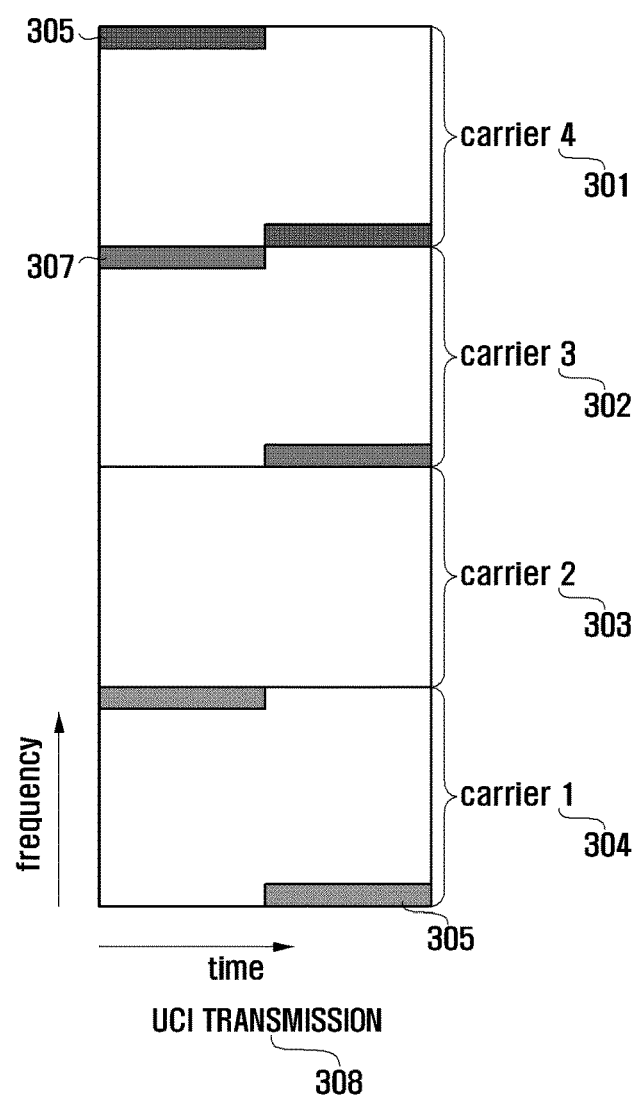
FIG. 4 is a diagram illustrating aggregation of component carriers transmitting PUCCHs carrying the UCI according to the first embodiment of the present invention.
Figure 5:
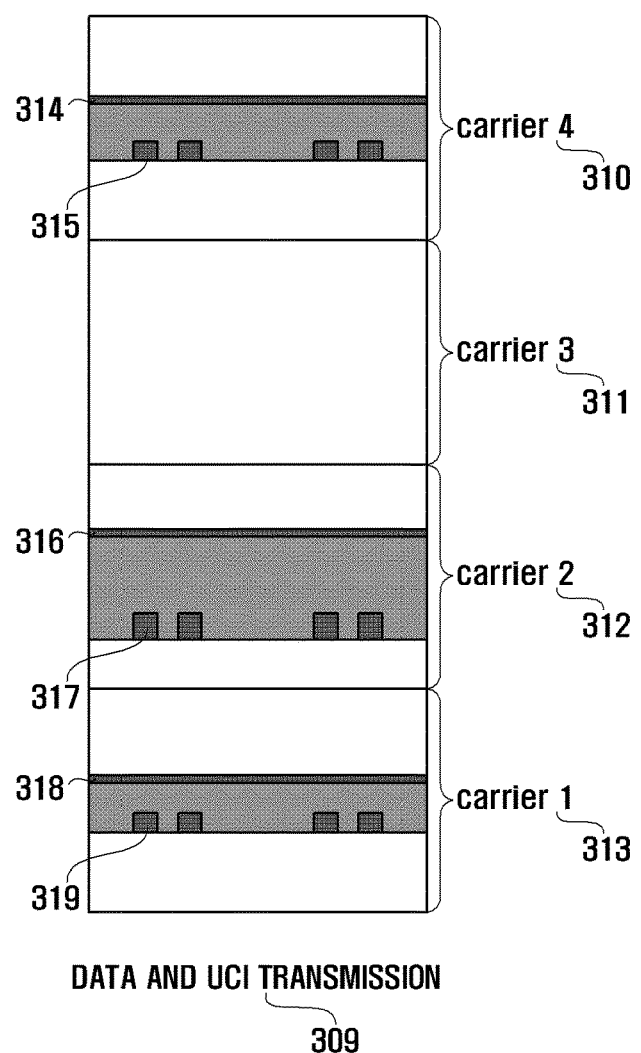
FIG. 5 is a diagram illustrating aggregation of component carriers transmitting PUSCHs carrying the UCI and data according to the first embodiment of the present invention.

FIG. 4 is a diagram illustrating aggregation of component carriers transmitting PUCCHs carrying the UCI according to the first embodiment of the present invention, and FIG. 5 is a diagram illustrating aggregation of component carriers transmitting PUSCHs carrying the UCI and data according to the first embodiment of the present invention.

Referring to FIG. 4, the UCI is transmitted on the PUCCHs since the uplink resource has not assigned to the mobile terminal yet. For instance, a plurality of CQI informations or HARQ ACK/RI informations are transmitted on the PUCCHs as denoted by reference numerals 305, 306, and 307 as shown in FIG. 4. However, when the uplink resource has been assigned, the UCI is transmitted on the PUSCHs along with the uplink data as denoted by reference numerals 314, 316, and 318 of FIG. 5. In case that the UCI is transmitted on the PUSCH, the UCI is distributed on the entire PUSCHs, thereby increasing frequency diversity gain.

How to calculate the resource amount per PUSCH for transmitting the UCI is described hereinafter. When a number of bits of the UCI to be transmitted on the $k^{th}$ PUSCH is Q_k, the Q_k is calculated by equations (5) and (6):

$$Q\_k = Q_{m,k} \cdot \min\left(p\_k \cdot \left\lceil \frac{O_k \cdot M_{sc,k}^{PUSCH} \cdot N_{symb,k}^{PUSCH} \cdot \beta_{offset,k}^{PUSCH}}{\sum_{r=0}^{C-1} K_{r,k}} \right\rceil, 4 \cdot M_{sc,k}^{PUSCH-current} \right),$$ (5)

$$Q\_k = Q_{m,k} \cdot \min\left(p\_k \cdot \left\lceil \frac{(O+L) \cdot M_{sc,k}^{PUSCH} \cdot N_{symb,k}^{PUSCH} \cdot \beta_{offset,k}^{PUSCH}}{\sum_{r=0}^{C-1} K_{r,k}} \right\rceil, M_{sc,k}^{PUSCH-current} \cdot N_{symb}^{PUSCH-current} - \frac{Q_{RI,k}}{Q_{m,k}} \right) \quad (6)$$

where O denotes a number of information bits of the UCI, $M_{sc,k}^{PUSCH}$ is a number of subcarriers assigned for $k^{th}$ PUSCH, $N_{symb,k}^{PUSCH}$ is a number of SC-FDMA symbols of $k^{th}$ PUSCH, and $K_{r,k}$ is a number of data bits before the channel coding per code block at $k^{th}$ PUSCH. $Q_{m,k}$ is a value determined according to the modulation scheme (2 for QPSK and 4 for 16 QAM).

Unlike the LTE system, the LTE-A system uses a newly introduced parameter p_k which determine the amount of the UCI bits per PUSCH. In an exemplary embodiment of the present invention, p_k is defined with two different methods in order to minimize the influence to the PUSCH transmission.

In the first method, the number of UCI symbols to be carried by each PUSCH is determined at the rate of physical bits that can be transmitted on each PUSCH. The first method for calculating the p_k can be expressed as equation (7):

$$p\_k = \frac{M_{sc,k}^{PUSCH-current} \cdot N_{symb,k}^{PUSCH-current} \cdot Q_{m,k}}{\sum_{k=0}^{s} M_{sc,k}^{PUSCH-current} \cdot N_{symb,k}^{PUSCH-current} \cdot Q_{m,k}} \quad (7)$$

where $M_{sc}^{PUSCH-current}$, $N_{symb}^{PUSCH-current} \cdot Q_{m,k}$ denotes a number of the subcarriers, a number of SC-FDMA symbols, and modulation scheme per PUSCH in a subframe.

In the second method, the number of UCI symbols to be carried by each PUSCH is determined at the rate of the modulation symbols on each PUSCH resource. The second method for calculating the p_k can be expressed as equation (8):

$$p\_k = \frac{M_{sc,k}^{PUSCH-current} \cdot N_{symb,k}^{PUSCH-current}}{\sum_{k=0}^{s} M_{sc,k}^{PUSCH-current} \cdot N_{symb,k}^{PUSCH-current}} \quad (8)$$

If the number of symbols required for transmitting the UCI per PUSCH is calculated by the above methods, it is advantageous to distribute the quality degradation of the data transmission uniformly. This is described with an exemplary case. Let's assume that two carriers are assigned for the PUSCH as shown in table 1.

TABLE 1

| | Modulation (Qm) | # of symbols | # of coded bits | # of Information bit | Code rate |
|---|---|---|---|---|---|
| PUSCH 1 | 2 | 150 | 300 | 100 | 0.33 |
| PUSCH 2 | 4 | 400 | 160 | 1000 | 0.625 |

If the CQI information to be transmitted is O=20 bits, Q' for each PUSCH is obtained by equation (3) after calculating the p_k using the first and second methods. Here, it is assumed that the number of subcarriers and the number of SC-FDMA symbols allocated by an initial PDCCH are identical with the number of subcarriers and the number of SC-FDMA symbols in the current subframe to be transmitted, respectively.

TABLE 2

| | | p_k | Q' (symbol) | actual code rate | Difference in code rate |
|---|---|---|---|---|---|
| Uniform division | PUSCH 1 | 0.5 | 15 | 0.37 | 0.037 |
| | PUSCH 2 | 0.5 | 4 | 0.63 | 0.006 |
| Method 1 | PUSCH 1 | 0.35 | 5 | 0.34 | 0.011 |
| | PUSCH 2 | 0.65 | 7 | 0.64 | 0.011 |
| Method 2 | PUSCH 1 | 0.27 | 8 | 0.35 | 0.019 |
| | PUSCH 2 | 0.73 | 6 | 0.63 | 0.010 |

Figure 16:
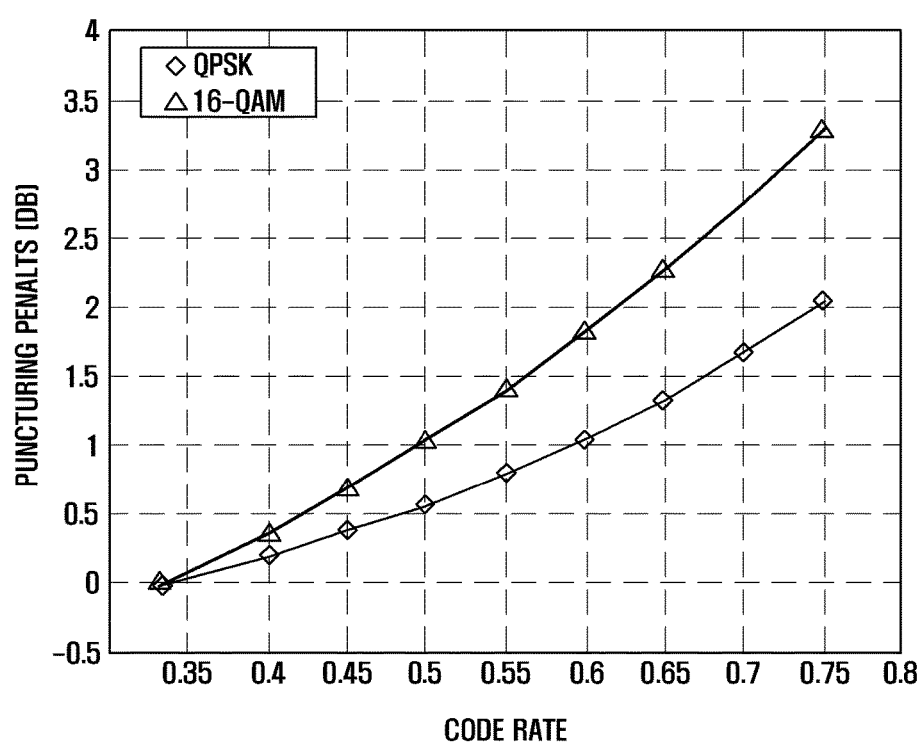
FIG. 16 is a graph illustrating typical performance degradation as the code rate increases in a system using a turbo code.

When Q' symbols are used for transmitting the UCI information, the number of symbols for transmitting the data decreases such that the actual code rate increases as shown in $5^{th}$ column of table 2. The $6^{th}$ column of table 2 shows the difference between the actual code rate and the ideal code rate when no UCI information is transmitted on the PUSCH. If the base station performs scheduling without consideration of the UCI transmission, the data transmission performance of the PUSCH is deteriorated as the code rate difference increases. The first method divides the number of UCI symbols at the physical bit rate such that the variation of the code rate is uniform accurately. When the UCI information are allocated to the two PUSCH uniformly without using any of the first and second methods, the variation of the code rate of data in PUSCH 1 is very high and, as a consequence, the data transmission performance of the PUSCH 1 is highly degraded. In case of using the first method, the number of UCI symbols are divided at the physical rate and thus the variation of the code rates are identical in both the PUSCH 1 and PUSCH 2. In case of using the second method, the variation of code rate is high in the PUSCH using low level modulation scheme due to the large puncturing amount. This is to make the performance degradation uniform by allocating relatively large number of symbols to the QPSK modulated symbols and relatively small number of symbols to the 16 QAM modulated symbols since the performance degradation caused by the code rage change is greater in 16 QAM than in QPSK as shown in FIG. 16. FIG. 16 is a graph illustrating typical performance degradation as the code rate increases in a system using a turbo code.

In the third method, the UCI bits are allocated to each PUSCH in proportion to the spectral efficiency and the number of symbols of the allocated PUSCH resource. The third method is similar to the second method except for considering the spectral efficiency such that the PUSCH resource having high spectral efficiency is preferably used to reduce the quality degradation of the PUSCH.

$$p\_k = \frac{(M_{sc,k}^{PUSCH-current} \cdot N_{symb,k}^{PUSCH-current})^2 / \left(\sum_{r=0}^{C-1} K_{r,k}\right)}{\sum_{k=0}^{s} (M_{sc,k}^{PUSCH-current} \cdot N_{symb,k}^{PUSCH-current})^2 / \left(\sum_{r=0}^{C-1} K_{r,k}\right)} \quad (9)$$

The total number of bits for transmitting one UCI is the sum of the UCI bits of individual PUSCHs and can be defined as $$Q = \sum_{k=0}^{s} Q\_k,$$

where s is the number of scheduled PUSCHs.

Figure 6:
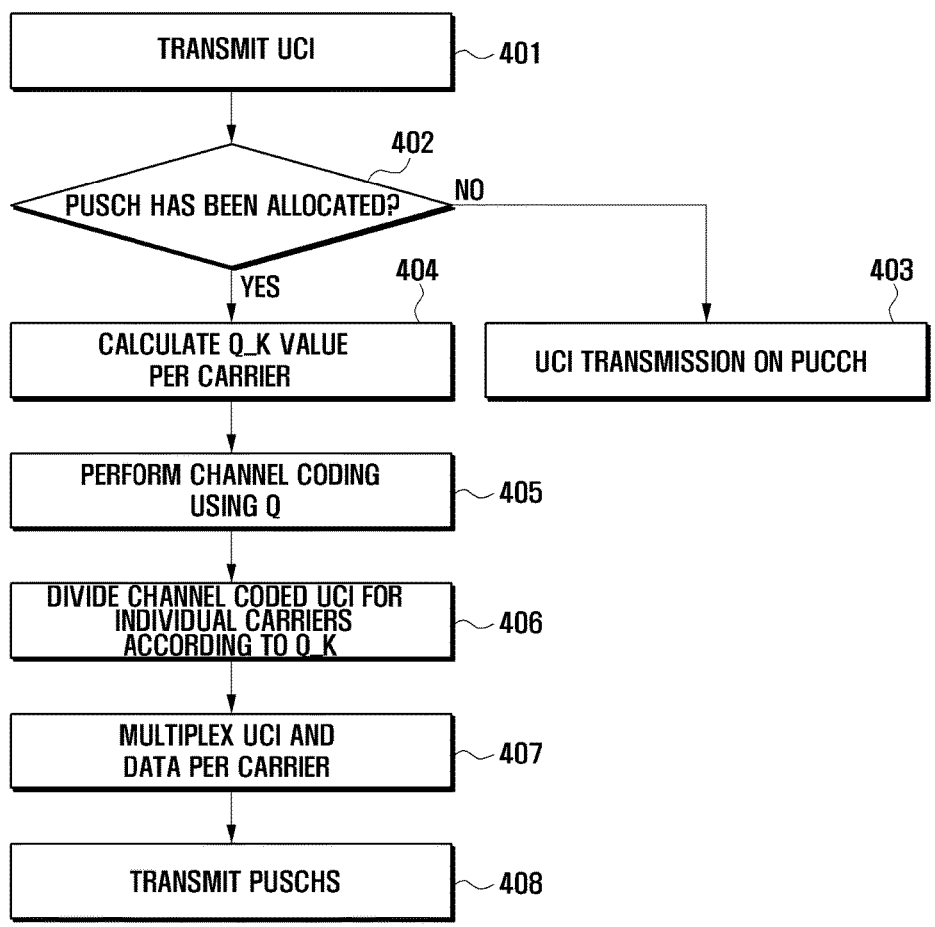
FIG. 6 is a flowchart illustrating a method for a mobile terminal to transmit a UCI in a wireless communication system according to a first embodiment of the present invention.

FIG. 6 is a flowchart illustrating a method for a mobile terminal to transmit a UCI in a wireless communication system according to a first embodiment of the present invention.

Referring to FIG. 6, the mobile terminal detects a need to transmit a UCI (401) and determines whether the PUSCHs have been allocated in the corresponding subframe for transmitting data (402). If no PUSCH has been allocated, the mobile terminal transmits the UCI on the preset PUCCH (403). Otherwise, if the PUSCHs have been allocated, the mobile terminal calculates a Q_k per PUSCH (404). At this time, the mobile terminal calculates the Q_k using equations (5) and (6). Next, the mobile terminal sums up the Q_k values of individual PUSCHs to obtain Q and performs channel coding by using the Q value (405) and divides the channel-coded UCI at the rate of Q_k per PUSCH (406). Next, the mobile terminal multiplexes the data and UCI per PUSCH (i.e., multiplexes the data and UCI per carrier) (407). At this time, the CQI information is arranged after the data as in the LTE system, the ACK/NACK information is substituted for corresponding data bits, and the RI information inserting at corresponding position by shifting the data bits. After multiplexing the UCI and data, the mobile terminal transmits the PUSCHs (408).

Figure 7:
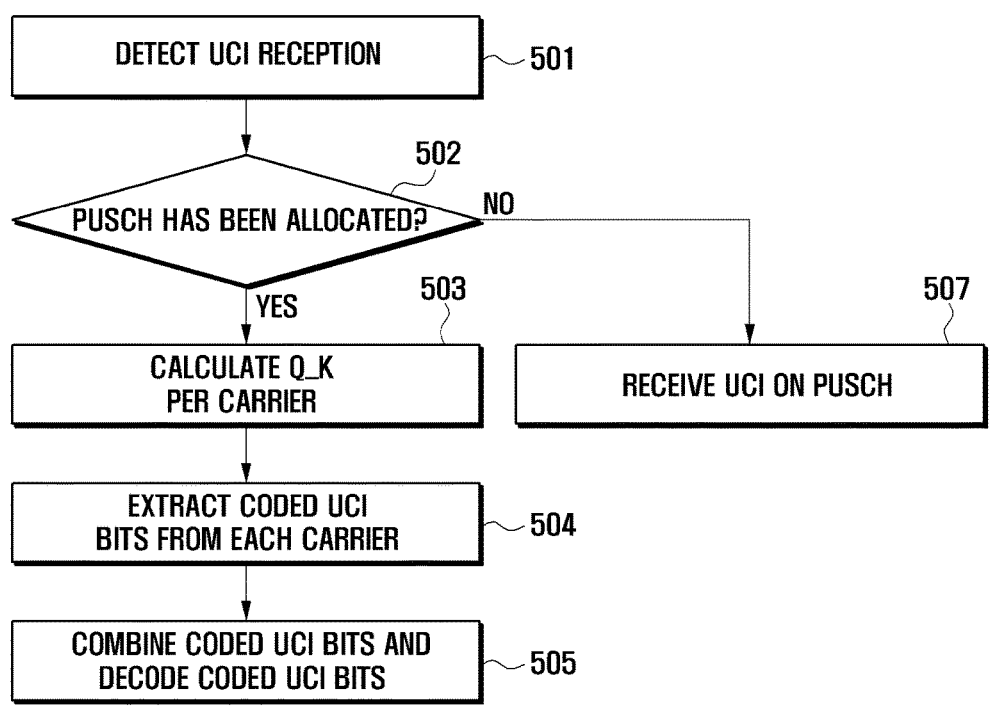
FIG. 7 is a flowchart illustrating a method for a base station to receive the UCI in a wireless communication system according to a first embodiment of the present invention.

FIG. 7 is a flowchart illustrating a method for a base station to receive the UCI in a wireless communication system according to a first embodiment of the present invention.

Referring to FIG. 7, the base station detects a receipt of the UCI transmitted by a mobile terminal (501) and determines whether the PUSCH has been allocated to the mobile terminal in the corresponding subframe (502). If no PUSCH has been allocated to the mobile terminal, the base station receives the UCI on the preset PUCCH (507). Otherwise, if the PUSCH has been allocated to the mobile terminal, the base station calculates the Q_k values of individual PUSCHs (503). At this time, the Q_k values are calculated using equations (5) and (6). Next, the base station extracts the coded UCI bits as much as Q_k per PUSCH (504) and then performs channel decoding on the entire coded bits (505).

Figure 8:
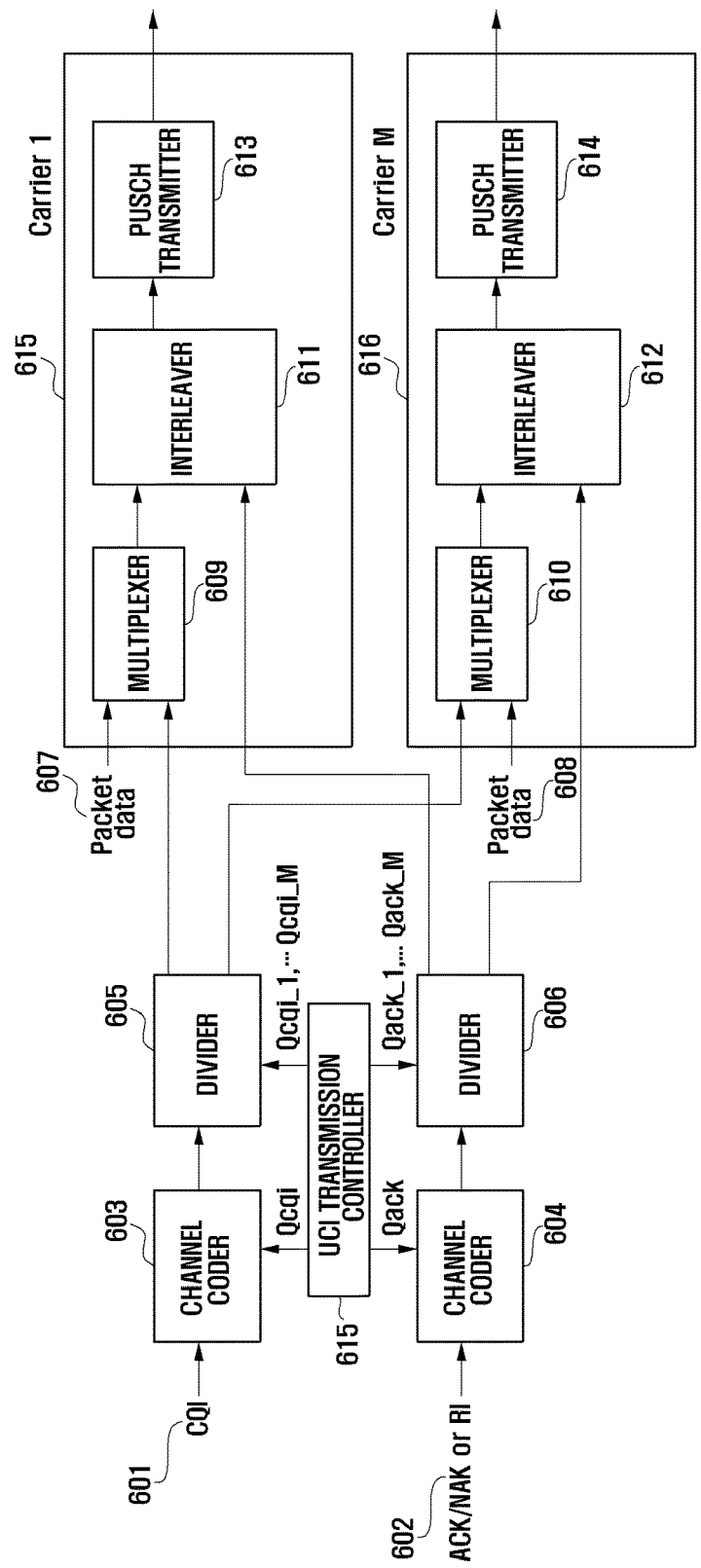
FIG. 8 is a block diagram illustrating a configuration of a mobile terminal for performing the UCI transmission method of FIG. 6.

FIG. 8 is a block diagram illustrating a configuration of a mobile terminal for performing the UCI transmission method of FIG. 6.

As shown in FIG. 8, the mobile terminal includes a plurality of channel coders 603 and 604, a plurality of dividers 605 and 606, a UCI transmission controller 615, and a plurality of PUSCH transmission units 615 and 616. The first per carrier transmitter 615 includes a multiplexer 609, an interleaver 611, and a PUSCH transmitter 613. The $M^{th}$ PUSCH transmission unit 616 includes a multiplexer 610, an interleaver 612, and a PUSCH transmitter 614.

The channel coder 603 (or 604) is responsible for channel coding per

UCI. Here, the ACK/NACK information and RI information are channel coded by the same channel coder. In FIG. 8, the channel coder 604 performs channel coding on the ACK/NACK information or RI information, and the channel coder 603 performs channel coding on the CQI information. The input of the channel coders 603 and 604 is the UCI information having the length of O, and the output of the channel coders 603 and 604 are channel-coded bits having the length of Q. Q is the sum of the Q_k values of the individual PUSCHs. The channel coders 603 and 604 output the channel-coded bits, i.e. the coded UCI, to the corresponding dividers 605 and 606. The UCI controller 615 controls the channel coders 603 and 604 and the dividers 605 and 606 and calculates and outputs the Q_k value per UCI and total Q value to the dividers 605 and 606.

The PUSCH transmission units 615 and 616 receive the outputs of the divider 605 and 606 and data packets and multiplex the divided coded UCIs and data. The number of PUSCH transmission units is determined depending on the number of allocated PUSCHs. In the exemplary embodiment of FIG. 8, it is assumed that M PUSCHs are allocated for data transmission. Each PUSCH transmission unit includes the multiplexer, interleaver, and PUSCH transmitter. The multiplexers 609 and 610 insert the UCI at the tail of the data rate-matched as much as the data amount to be transmitted after encoding. At this time, the multiplexers 609 and 610 multiplex the data and the CQI information output by the divider 605 as shown in FIG. 8. The ACK/NACK information or RI information input to the interleavers 611 and 612 so as to be interleaved with the output of the multiplexers 609 and 610. That is, the CQI is multiplexed with the data, and then interleaved with the multiplexed data and ACK/NACK information or RI information at the interleavers 611 and 612. The multiplexed data and UCI are processed by the PUSCH transmitters 613 and 614 and then transmitted through the PUSCH channels.

As aforementioned, the PUSCH transmission units 615 and 616 are provided as many as the number of PUSCHs and distribute the UCI on the individual PUSCHs to transmit along with the packet data. Here, the divider 605 divides the CQI information and outputs the divided CQI information to the multiplexers 609 and 610 in distributed manner, and the divider 606 divides the ACK/NACK information or RI information and outputs the divided ACK/NACK information or RI information to the interleavers 611 and 612 in distributed manner. The multiplexers 609 and 610 multiplexes the CQI information and the packet data, and the interleavers 611 and 612 interleaves the outputs of the multiplexers 609 and 610 with the ACK/NACK information or RI information and output the multiplexed results to the PUSCH transmitters 613 and 614.

Figure 9:
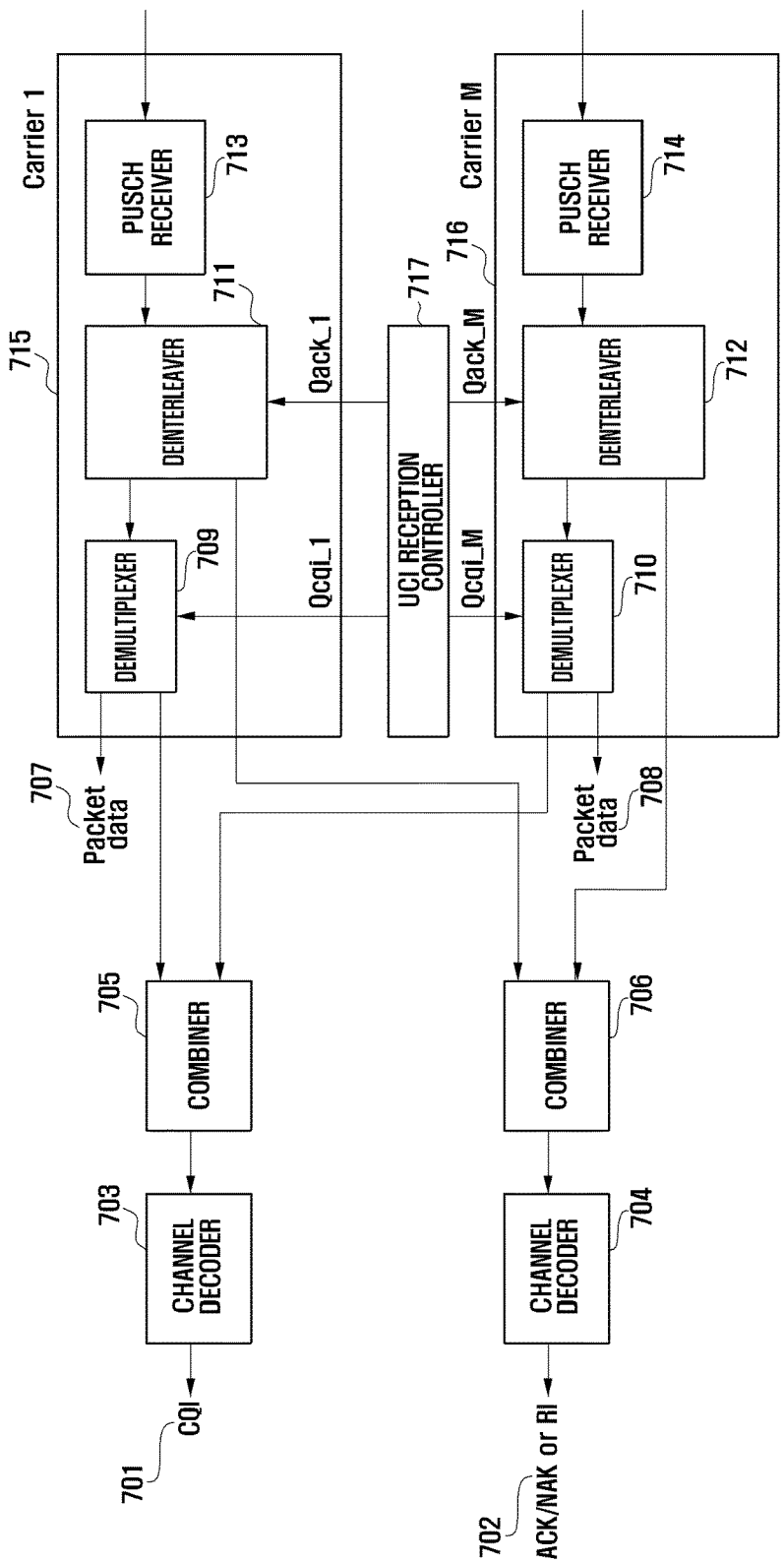
FIG. 9 is a block diagram illustrating a configuration of a base station for performing the UCI reception method of FIG. 7.

FIG. 9 is a block diagram illustrating a configuration of a base station for performing the UCI reception method of FIG. 7.

As shown in FIG. 8, the base station includes a plurality of channel decoders 703 and 704, a plurality of combiners 705 and 706, a plurality of PUSCH reception units 715 and 716, and a UCI reception controller 717. The first PUSCH reception unit 715 includes a demultiplexer 709, a deinterleaver 711, and a PUSCH receiver 713, and the $M^{th}$ PUSCH reception unit 716 includes a demultiplexer 710, a deinterleaver 712, and a PUSCH receiver 714.

The number of PUSCH reception units is determined depending on the number of allocated PUSCHs. Each of the PUSCH reception unit 715 and 716 includes a PUSCH receiver, a deinterleaver, and a demultiplexer. The PUSCH receivers 713 ad 714 receives the data an UCI transmitted by the mobile terminal on the PUSCHs. The UCI reception controller 717 outputs Qack 1, . . . , Qack M values representing the amounts of coded UCI of the ACK/NACK information or the RI information for the individual PUSCHs to the deinterleaver 711 and 712 to calculate the amount of the ACK/NACK information and RI information, and outputs the Qcqi 1, . . . Qcqi M values representing the amount of the coded UCI for individual PUSCHs to the demultiplexers 709 and 710 to calculated the amount of the CQI information.

In case that the UCI is transmitted, the deinterleavers 711 and 712 performs deinterleaving on the PUSCHs to output the multiplexed data and ACK/NACK information and/or RI information. In order to calculate the amounts of the ACK/NACK information and RI information, the deinterleavers 711 and 712 uses the Qack_1, . . . , Qack_M values representing the coded UCI amounts on the individual PUSCHs carrying the ACK/NACK information or the RI information. The CQI information is extracted by the demultiplexers 709 and 710. In order to extract the CQI information, the demultiplexers 709 and 710 use the Qcqi_1, . . . , Qcqi_M values provided by the UCI reception controller 717.

The UCI bits extracted from the individual PUSCHs are output to the combiners 705 and 706 so as to be combined into coded UCIs. The coded UCIs are output to the channel decoder 703 and 704 so as to be decoded into the original UCI.

Second Embodiment

In the second embodiment of the present invention, when multiple PUSCHs are allocated in multiple carriers for data transmission, one of the PUSCH resources (called special PUSCH) is used for transmission of the UCI.

Figure 10:
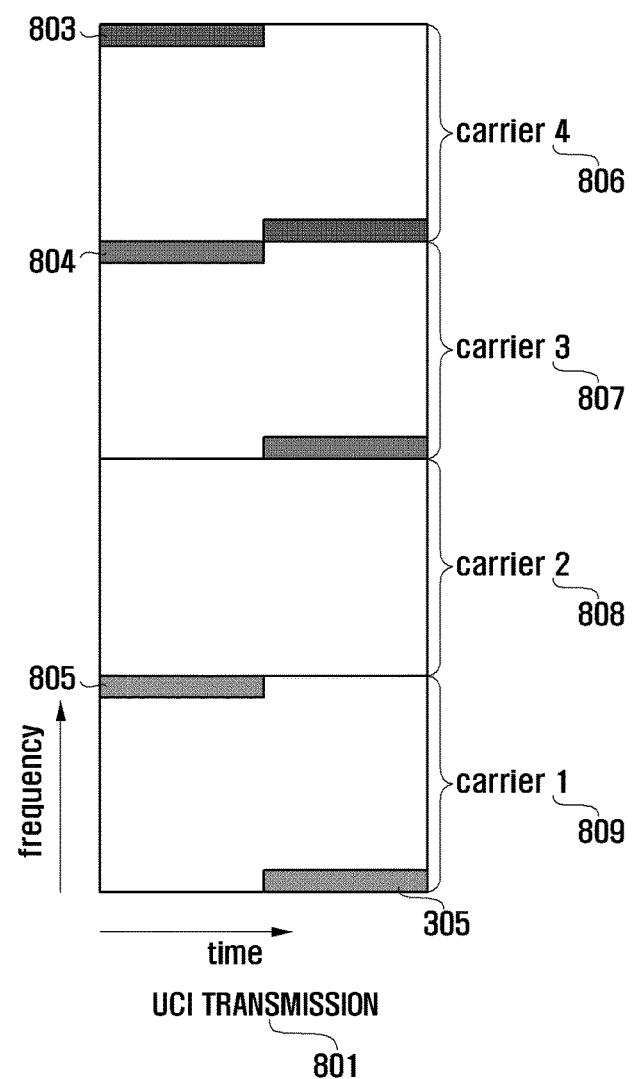
FIG. 10 is a diagram illustrating aggregation of component carriers transmitting PUCCHs carrying the UCI according to the second embodiment of the present invention.
Figure 11:
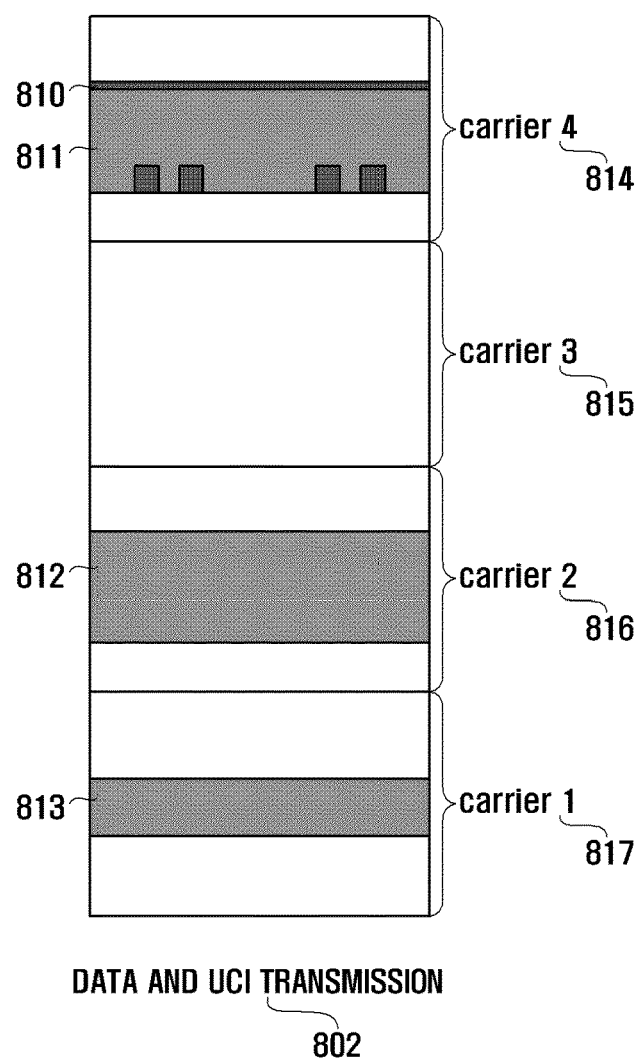
FIG. 11 is a diagram illustrating aggregation of component carriers transmitting PUSCHs carrying the UCI and data according to the second embodiment of the present invention.

FIG. 10 is a diagram illustrating aggregation of component carriers transmitting PUCCHs carrying the UCI according to the second embodiment of the present invention, and FIG. 11 is a diagram illustrating aggregation of component carriers transmitting PUSCHs carrying the UCI and data according to the second embodiment of the present invention.

Referring to FIG. 10, 4 component carriers 806, 807, 808, and 809 are aggregated, and the UCI is transmitted on the PUCCHs since the uplink resource has not assigned to the mobile terminal yet. The PUCCHs are transmitted on the reserved regions at the edges 803, 804, and 805 of the component carriers. However, when the PUSCH has been assigned in the subframe, the UCI 801 is multiplexed with the PUSCH 811 in a carrier component as shown in FIG. 11. In FIG. 11, the PUSCH are assigned in the first, second, and fourth carriers 817, 816, and 814, and the UCI is carried on the PUSCH of the fourth carrier 814. This is because the PUSCH of the fourth carrier is the special PUSCH of the mobile terminal.

How to select a special PUSCH is described hereinafter.

The first method multiplexes the UCI with the data on the PUSCH assigned by a dynamic scheduling but not by the semi-persistent scheduling (PSP). Typically, the SPS resource is small in size and occurs periodically for transmitting the delay sensitive data such as Voice over IP (VoIP) traffic. If the UCI transmission is carried on the SPS resource allocated for the delay sensitive data transmission, the data may not be completely transmitted at a time due to the puncturing loss caused by the UCI. Since the delay sensitive data is vulnerable to retransmission, it is preferred not to use the SPS resource for transmitting the UCI. Accordingly, the PUSCH allocated on the dynamic scheduling resource is selected as the special PUSCH.

The second method multiplexes the UCI with the data on the PUSCH having the low spectral efficiency. As aforementioned in the first embodiment, as the spectral efficiency is low, the puncturing loss decreases. Accordingly, it is preferred to multiplex the UCI with the data on the PUSCH having the lowest spectral efficiency.

The third method multiplexes the UCI with the data on the PUSCH of the carrier indicated by the lowest carrier index. This method is the simplest method for selecting the special PUSCH to carry the UCI. In this case, the terminal-specific carrier indexing set by the upper layer signaling, rather than the cell-specific carry indexing, can be used. For instance, a UE1 can use the index list sorted in order of carrier 1, carrier 2, carrier 3, and carrier; while a UE2 uses the index sorted in order of carrier 3, carrier 2, carrier 1, and carrier 4, whereby the UEs have the different lowest indices.

These methods can be used in combination with each other. For instance, when multiple carriers are allocated dynamic scheduling resources, the special PUSCH can be selected using the second and third methods, although it is possible to transmit the UCI on the multiple carriers in distributed manner as described in the first embodiment.

Figure 12:
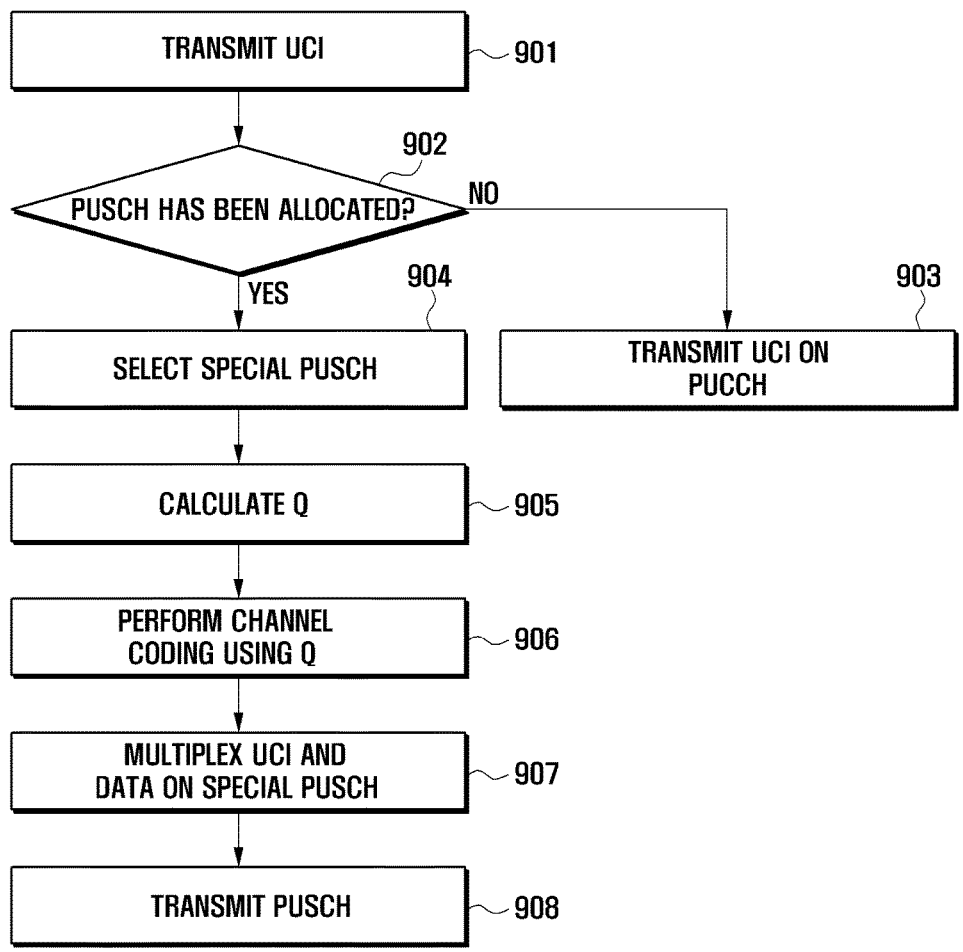
FIG. 12 is a flowchart illustrating a method for a mobile terminal to transmit a UCI in a wireless communication system according to a second embodiment of the present invention.

FIG. 12 is a flowchart illustrating a method for a mobile terminal to transmit a UCI in a wireless communication system according to a second embodiment of the present invention.

Referring to FIG. 12, the mobile terminal detects a need to transmit a UCI (901) and determines whether the PUSCHs have been allocated in the corresponding subframe for transmitting data (902). If no PUSCH has been allocated, the mobile terminal transmits the UCI on the preset PUCCH (903). Otherwise, if the PUSCHs have been allocated, the mobile terminal selects a special PUSCH (904). The special PUSCH is selected by using at least one of the first to third methods. In case that only one carrier assigned the PUSCH exist, the very PUSCH is selected as the special PUSCH. Next, the mobile terminal calculates the Q value (905). The Q value is calculated using equations (1) to (4). Once the Q value is calculated, the mobile terminal performs channel coding on the UCI according to the UCI type using the Q value (906). Next, the mobile terminal multiplexes the UCI and data on the special PUSCH (907) and transmits the PUSCHs (908).

Figure 13:
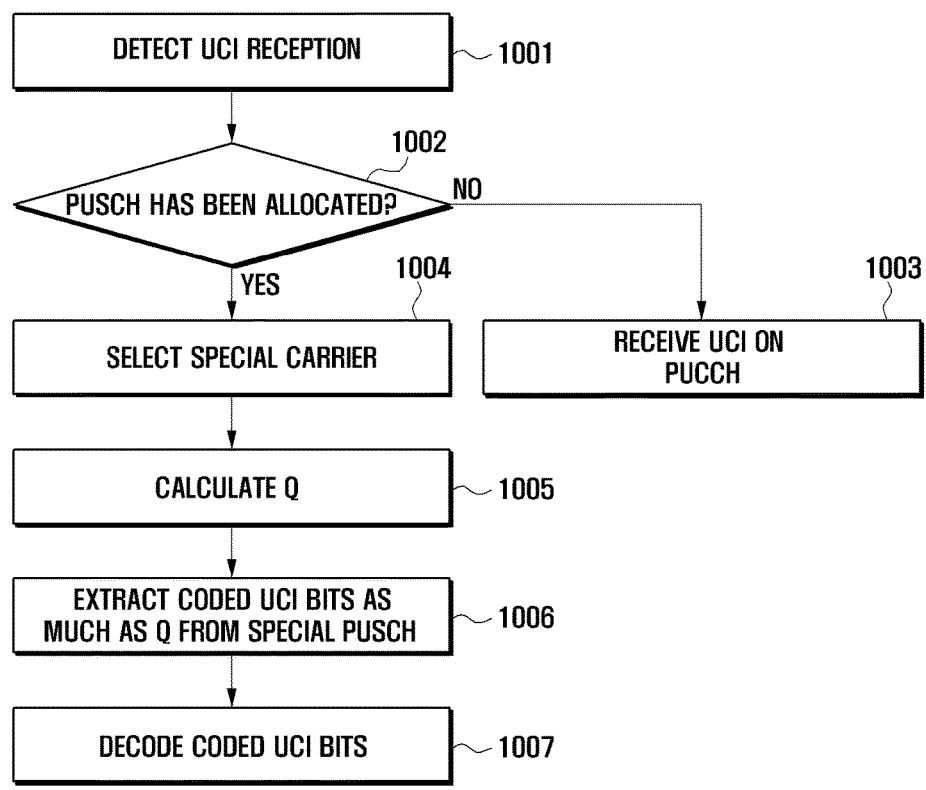
FIG. 13 is a flowchart illustrating a method for a base station to receive the UCI in a wireless communication system according to a second embodiment of the present invention.

FIG. 13 is a flowchart illustrating a method for a base station to receive the UCI in a wireless communication system according to a second embodiment of the present invention.

Referring to FIG. 13, the base station detects a receipt of the UCI of the UCI transmitted by a mobile terminal (1001) and determines whether the PUSCH has been allocated to the mobile terminal in the corresponding subframe (1002). If no PUSCH has been allocated to the mobile terminal, the base station receives the UCI on the present PUCCH (1003). Otherwise, in the PUSCH has been allocated to the mobile terminal, the base station selects the special PUSCH (1004). The special PUSCH is selected by using at least one of the first to third methods as in the mobile terminal. Next, the base station calculates the Q value using equations (1) to (4), based on the information about the special PUSCH and the UCI (1005). Next, the base station extracts the UCI as much as the Q from the special PUSCH (1006). Finally, the base station performs channel decoding on the extracted UCI (coded UCI bits) to obtain the UCI (1007).

Figure 14:
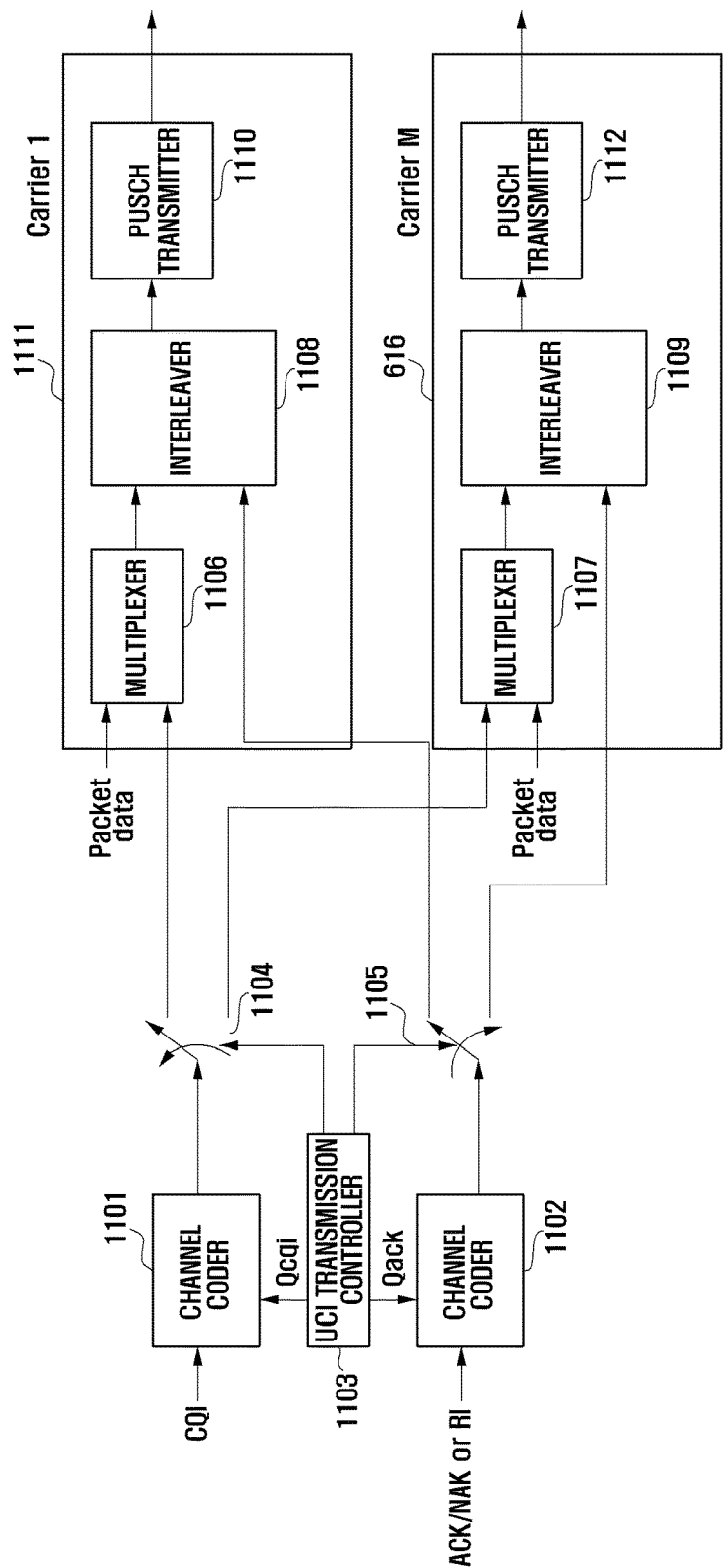
FIG. 14 is a block diagram illustrating a configuration a mobile terminal for performing the UCI transmission method of FIG. 12.

FIG. 14 is a block diagram illustrating a configuration a mobile terminal for performing the UCI transmission method of FIG. 12.

As shown in FIG. 14, the mobile terminal includes a plurality of channel coders 1101 and 1103, a UCI transmission controller 1103, a plurality of switches 1104 and 1105, a plurality of PUSCH transmission units 1111 and 1112. The first PUSCH transmission 1111 includes a multiplexer 1106, an interleaver 1108, and a PUSCH transmitter 1110; and the $M^{th}$ PUSCH transmission unit 1113 includes a multiplexer 1107, and interleaver 1109, and a PUSCH transmitter 1112. The mobile terminal supports M PUSCHs.

The channel coders 1101 and 1102 perform channel coding on respective types of UCI. The UCI transmission controller 1103 provides the channel coders 1101 and 1102 with the length of the coded bits to be output since the number of the coded bits is changed depending to the spectral efficiency of the PUSCH. The UCI transmission controller 1103 selects the special PUSCH according to the above described process, determines the Q value according to the spectral efficiency of the special PUSCH, and outputs the Q value to the channel coder 1101 and 1102.

Each of the PUSCH transmission units 1111 and 1113 includes a multiplexer, an interleaver, and a PUSCH transmitter. The multiplexers 1106 and 1107 multiplexes the CQI information of the UCI with the data, and the interleavers 1108 and 1109 interleavers the ACK/NACK information or the RI information with the output of the multiplexers 1106 and 1107. In the second embodiment of the present invention, the UCI is multiplexed with the data on only the special PUSCH, and thus the switches 1104 and 1105 are needed. Once the special PUSCH is selected, the UCI transmission controller 1103 controls the switches 1104 and 1105 to output the channel coded UCI only when the special PUSCH is transmitted. For instance, if it is determined to transmit the UCI on the carrier 1 (i.e. the carrier 1 is selected as the special carrier), the switches 1104 and 1105 are switched to the PUSCH transmission unit 1111 under the control of the UCI transmission controller 1103, whereby the multiplexer 1106 multiplexes the CQI information of the UCI output by the channel coder 1101 with the data to be transmitted on the special PUSCH, and the interleaver 1108 interleaves the ACK/NACK information or the RI information of the UCI output by the channel coder 1102 with the output of the multiplexer 1106. As a consequence, the PUSCH transmitter 1110 of the PUSCH transmission 1111 transmits the data along with the UCI, and the PUSCH transmitter 1112 of the PUSCH transmission unit 1113 transmits only data.

Figure 15:
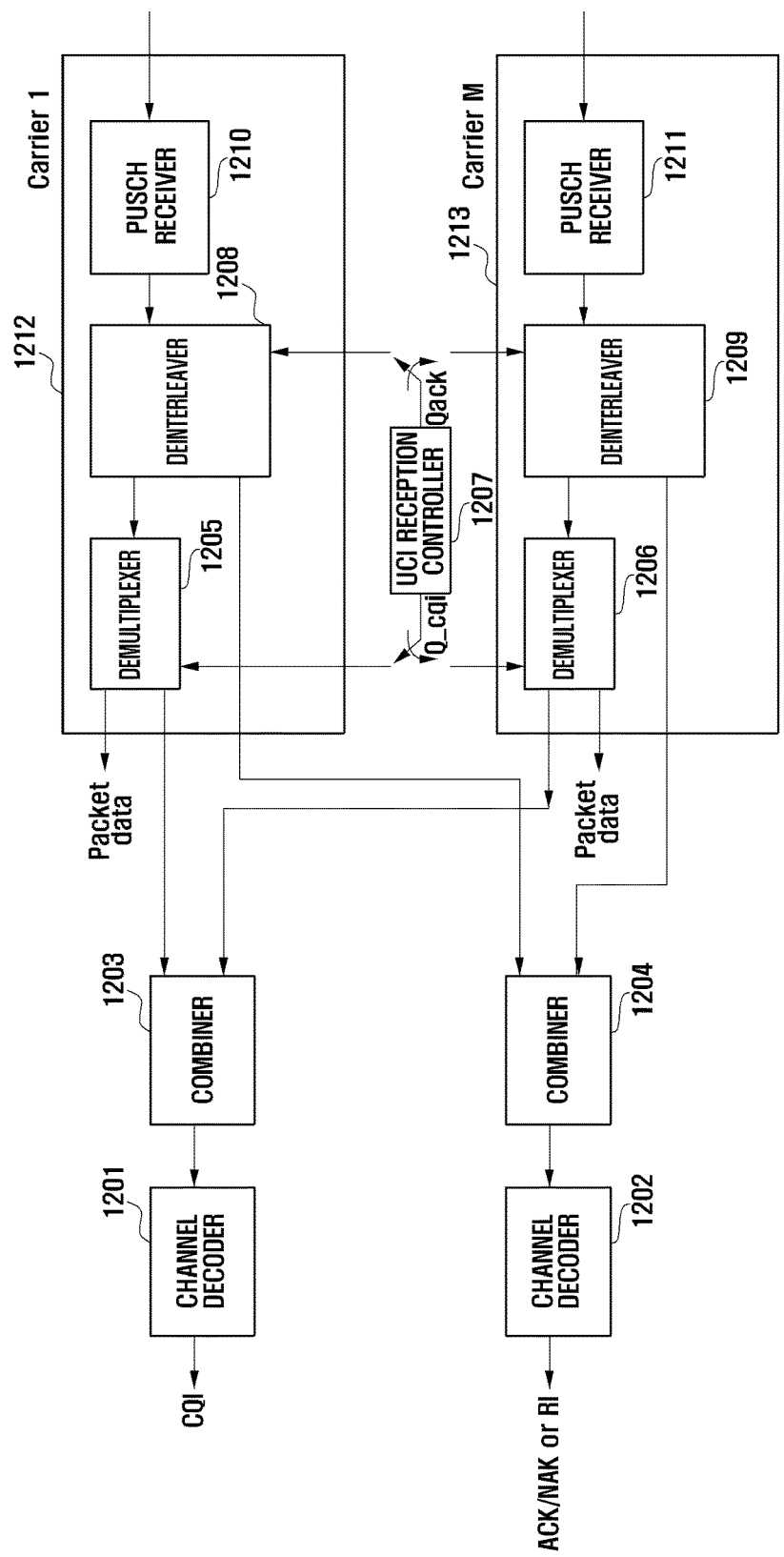
FIG. 15 is a block diagram illustrating a configuration of a base station for performing the UCI reception method of FIG. 13.

FIG. 15 is a block diagram illustrating a configuration of a base station for performing the UCI reception method of FIG. 13.

As shown in FIG. 15, the base station includes a plurality of channel decoders 1201 and 1202, a plurality of combiner 1203 and 1204, a plurality of PUSCH reception units 1212 and 1213, and a UCI reception controller 1207. The first PUSCH reception unit 1212 includes a demultiplexer 1205, a deinterleaver 1208, and a PUSCH receiver 1210; and the $M^{th}$ PUSCH reception unit 1213 includes a demultiplexer 1206, a deinterleaver 1209, and a PUSCH receiver 1211.

The number of PUCCH reception units of the base station is determined depending on the number of PUSCHs, i.e. the number of aggregated carriers. Each of the PUSCH reception units 1212 and 1213 includes a PUSCH receiver, a deinterleaver, and a demultiplexer. The demultiplexer performs demultiplexing on the received signal to extract the CQI information, and the deinterleaver performs deinterleaving on the demultiplexed signal to extract the ACK/NACK information or the RI information. The UCI reception controller 1207 calculates the Q value and provides the calculated Q value to the PUSCH reception units 1212 and 1213. At this time, the Q value is provided to the multiplexer and deinterleaver of one of the PUSCH reception units 1212 and 1213 which is responsible for processing the special PUSCH. That is, the UCI reception controller 1207 checks the special PUSCH and provides the Q value to the PUSCH reception unit which is responsible for the special PUSCH.

As described above, the UCI transmission/reception method and apparatus of the present invention is capable of determining the resources for transmitting the UCI on the PUSCHs in the system supporting multicarrier transmission efficiently, thereby improving reliability of the UCI transmitted on the PUSCHs without compromising data transmission performance of the PUSCHs.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method by a terminal in a wireless communication system, the method comprising:
generating uplink control information (UCI) including at least one of channel quality indicator (COI) information and hybrid automatic repeat request (HARQ) information;
identifying, if the terminal is configured with a plurality of serving cells, a serving cell among the plurality of serving cells based on information on a cell index of the serving cell; and
transmitting the UCI on a physical uplink shared channel (PUSCH) of the identified serving cell.

2. The method of claim 1, wherein the identified serving cell has a smallest cell index among the plurality of serving cells.

3. The method of claim 1, wherein the plurality of serving cells includes a first cell and at least one second cell, and
wherein the first cell has a smallest cell index among the plurality of serving cells.

4. The method of claim 3, wherein the first cell is a primary cell and the at least one second cell is at least one secondary cell.

5. The method of claim 4, wherein the primary cell is the identified serving cell, if the PUSCH is allocated to the primary cell.

6. The method of claim 4, wherein a secondary cell with a smallest cell index among the at least one secondary cell is the identified serving cell, if the PUSCH is not allocated to the primary cell.

7. A terminal in a wireless communication system, the terminal comprising:
a transceiver; and
a controller configured to:
generate uplink control information (UCI) including at least one of channel quality indicator (CQI) information and hybrid automatic repeat request (HARQ) information,
identify, if the terminal is configured with a plurality of serving cells, a serving cell among the plurality of serving cells based on information on a cell index of the serving cell, and
transmit, via the transceiver, the UCI on a physical uplink shared channel (PUSCH) of the identified serving cell.

8. The terminal of claim 7, wherein the identified serving cell has a smallest cell index among the plurality of serving cells.

9. The terminal of claim 7, wherein the plurality of serving cells include a first cell and at least one second cell, and wherein the first cell has a smallest cell index among the plurality of serving cells.

10. The terminal of claim 9, wherein the first cell is a primary cell and the at least one second cell is at least one secondary cell.

11. The terminal of claim 10, wherein the primary cell is the identified serving cell, if the PUSCH is allocated to the primary cell.

12. The terminal of claim 10, wherein a secondary cell with a smallest cell index among the at least one secondary cell is the identified serving cell, if the PUSCH is not allocated to the primary cell.

13. A method by a base station in a wireless communication system, the method comprising:
- receiving uplink control information (UCI) including at least one of channel quality indicator (CQI) information and hybrid automatic repeat request (HARQ) information through a serving cell of a terminal configured with a plurality of serving cells; and
- decoding the UCI,
- wherein the serving cell for receiving the UCI among the plurality of serving cells is determined based on information on a cell index of the serving cell.

14. The method of claim 13, wherein the serving cell for the UCI has a smallest cell index among the plurality of serving cells.

15. The method of claim 13, wherein the plurality of serving cells include a first cell and at least one second cell, and
- wherein the first cell has a smallest cell index among the plurality of serving cells.

16. The method of claim 15, wherein the first cell is a primary cell and the at least one second cell is at least one secondary cell.

17. The method of claim 16, wherein the primary cell is the serving cell for the UCI, if a physical uplink shared channel (PUSCH) is allocated to the primary cell.

18. The method of claim 16, wherein a secondary cell with a smallest cell index among the at least one secondary cell is the serving cell for the UCI, if a physical uplink shared channel (PUSCH) is not allocated to the primary cell.

19. A base station in a wireless communication system, the base station comprising:
- a transceiver; and
- a controller configured to:
  - receive uplink control information (UCI) including at least one of channel quality indicator (CQI) information and hybrid automatic repeat request (HARQ) information through a serving cell of a terminal configured with a plurality of serving cells, and
  - decode the UCI,
- wherein the serving cell for receiving the UCI among the plurality of serving cells is determined based on information on a cell index of the serving cell.

20. The base station of claim 19, wherein the serving cell for the UCI has a smallest cell index among the plurality of serving cells.

21. The base station of claim 19, wherein the plurality of serving cells include a first cell and at least one second cell, and
- wherein the first cell has a smallest cell index among the plurality of serving cells.

22. The base station of claim 21, wherein the first cell is a primary cell and the at least one second cell is at least one secondary cell.

23. The base station of claim 22, wherein the primary cell is the serving cell for the UCI, if a physical uplink shared channel (PUSCH) is allocated to the primary cell.

24. The base station of claim 22, wherein a secondary cell with a smallest cell index among the at least one secondary cell is the serving cell for the UCI, if a physical uplink shared channel (PUSCH) is not allocated to the primary cell.

* * * * *